United States Patent
Gaufin et al.

(10) Patent No.: US 12,304,259 B2
(45) Date of Patent: *May 20, 2025

(54) APPARATUSES, SYSTEMS, AND METHODS FOR DETERMINING AND VERIFYING OPERATIONAL STATES OF FIFTH WHEELS

(71) Applicant: Fontaine Fifth Wheel Company, Jasper, AL (US)

(72) Inventors: Carl Gaufin, Madison, AL (US); Michael Shane Wolfe, Hanceville, AL (US)

(73) Assignee: Fontaine Fifth Wheel Company, Jasper, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,974

(22) Filed: Dec. 20, 2023

(65) Prior Publication Data
US 2024/0116318 A1 Apr. 11, 2024

Related U.S. Application Data

(63) Continuation of application No. 18/052,687, filed on Nov. 4, 2022, now Pat. No. 11,865,882, which is a (Continued)

(51) Int. Cl.
*B60D 1/58* (2006.01)
*B60D 1/01* (2006.01)
*G01D 5/14* (2006.01)

(52) U.S. Cl.
CPC ............... *B60D 1/58* (2013.01); *B60D 1/015* (2013.01); *G01D 5/142* (2013.01)

(58) Field of Classification Search
CPC ............ B60D 1/58; B60D 1/015; G01D 5/142
(Continued)

(56) References Cited

U.S. PATENT DOCUMENTS 2,977,137 A 3/1961 Durham
4,477,100 A 10/1984 Elyakim
(Continued)

FOREIGN PATENT DOCUMENTS

CA 2340575 10/2001
CA 2341799 10/2021
(Continued)

OTHER PUBLICATIONS https://www.jostinformationcentre.com/static/upload/pdf/truck/Sensor_JSK_MUB007001M01_REV-A_05-2018_en.pdf, Jost World, Sensor JSK, Installation and operating instructions, May 2018.
(Continued)

*Primary Examiner* — Kam Wan Ma
(74) *Attorney, Agent, or Firm* — Andrus Intellectual Property Law, LLP

(57) ABSTRACT

Apparatuses, systems, and methods for determining and verifying operational states of fifth wheels. Certain methods for determining the operational state of the fifth wheel may include sensing, with at least one sensor, magnetic flux caused by a magnet on a movable component movable to lock the fifth wheel to a kingpin of a towed vehicle and determining an end position of the movable component based on the magnetic flux. The end position of the movable component is then compared to a threshold position and an operational state of the fifth wheel is determined based on the comparison of the end position of the movable component to the threshold position.

16 Claims, 8 Drawing Sheets

Related U.S. Application Data continuation of application No. 16/776,058, filed on Jan. 29, 2020, now Pat. No. 11,524,536.

(60) Provisional application No. 62/805,679, filed on Feb. 14, 2019.

(58) Field of Classification Search
USPC .................................................... 340/431
See application file for complete search history.

(56) References Cited

U.S. PATENT DOCUMENTS

| | | | |
|---|---|---|---|
| 4,804,234 | A | 2/1989 | Gee et al. |
| 4,946,183 | A | 8/1990 | Benson et al. |
| 5,152,544 | A | 10/1992 | Dierker, Jr. et al. |
| 5,193,063 | A | 3/1993 | Assh |
| 5,477,207 | A | 12/1995 | Frame, Sr. et al. |
| 5,516,137 | A | 5/1996 | Kass et al. |
| 5,516,138 | A | 5/1996 | Fontaine |
| 5,641,174 | A | 6/1997 | Terry et al. |
| 5,861,802 | A | 1/1999 | Hungerink et al. |
| 5,876,055 | A | 3/1999 | Fontaine |
| 5,988,665 | A | 11/1999 | Terry et al. |
| 5,988,666 | A | 11/1999 | Flater |
| 6,095,544 | A | 8/2000 | Flater |
| 6,100,794 | A | 8/2000 | Hillier |
| 6,130,487 | A | 10/2000 | Bertalan et al. |
| 6,285,278 | B1 | 9/2001 | Schutt et al. |
| 6,352,137 | B1 | 3/2002 | Stegall |
| 6,452,485 | B1 | 9/2002 | Schutt et al. |
| 6,587,041 | B1 | 7/2003 | Brown, Jr. |
| 6,739,611 | B2 | 5/2004 | Gisinger et al. |
| 6,866,283 | B2 * | 3/2005 | Alguera ................. B62D 53/10 280/435 |
| 7,140,632 | B2 | 11/2006 | Alguera et al. |
| 7,240,913 | B2 | 7/2007 | Kahrs et al. |
| 7,384,056 | B2 | 6/2008 | Anderson |
| 7,537,235 | B2 | 5/2009 | Flater et al. |
| 7,548,155 | B2 | 6/2009 | Schutt et al. |
| 7,555,370 | B2 | 6/2009 | Breed et al. |
| 7,556,278 | B2 | 7/2009 | Roberts et al. |
| 7,735,849 | B1 | 6/2010 | Mann |
| 7,825,783 | B2 | 11/2010 | Gallego et al. |
| 7,889,096 | B2 | 2/2011 | Breed |
| 7,932,816 | B2 | 4/2011 | Schmidt et al. |
| 8,024,084 | B2 | 9/2011 | Breed |
| 8,036,788 | B2 | 10/2011 | Breed |
| 8,210,558 | B2 | 3/2012 | Mann et al. |
| 8,229,624 | B2 | 7/2012 | Breed |
| 9,102,371 | B2 | 8/2015 | Keatley |
| 9,157,721 | B1 * | 10/2015 | Davis ................... G01B 5/0004 |
| 9,302,557 | B2 | 4/2016 | Alldredge et al. |
| 9,327,782 | B2 | 5/2016 | Alldredge et al. |
| 9,723,692 | B2 | 8/2017 | Sibley, Jr. et al. |
| 9,738,125 | B1 * | 8/2017 | Brickley ................. H04W 4/70 |
| 9,738,333 | B2 | 8/2017 | Alldredge et al. |
| 9,862,242 | B2 | 1/2018 | Lurie |
| 10,351,061 | B1 | 7/2019 | Chaudhari |
| 10,654,772 | B2 | 5/2020 | Vajda et al. |
| 10,926,816 | B2 | 2/2021 | Schutt et al. |
| 11,364,885 | B2 | 6/2022 | Viele |
| 11,524,536 | B2 | 12/2022 | Gaufin et al. |
| 2004/0017285 | A1 | 1/2004 | Zielinski et al. |
| 2004/0075241 | A1 | 4/2004 | Alguera et al. |
| 2004/0148078 | A1 | 7/2004 | Nakano et al. |
| 2005/0189937 | A1 | 9/2005 | Blubaugh |
| 2006/0186636 | A1 * | 8/2006 | Schutt ..................... B60D 1/36 280/477 |
| 2008/0191937 | A1 | 8/2008 | Wisherd et al. |
| 2008/0303647 | A1 | 12/2008 | Pare |
| 2011/0010065 | A1 | 1/2011 | Bach et al. |
| 2011/0079138 | A1 | 4/2011 | Storrie |
| 2015/0203128 | A1 | 7/2015 | Strano |
| 2016/0052568 | A1 * | 2/2016 | Friesen .............. B62D 53/0814 280/438.1 |
| 2016/0075197 | A1 | 3/2016 | Coleman |
| 2017/0015163 | A1 | 1/2017 | Sielhorst |
| 2017/0174019 | A1 | 6/2017 | Lurie |
| 2017/0174275 | A1 | 6/2017 | Mohamad Jembari et al. |
| 2017/0305436 | A1 | 10/2017 | Maskell et al. |
| 2017/0368897 | A1 | 12/2017 | Brickley et al. |
| 2019/0071123 | A1 | 3/2019 | Zhang et al. |
| 2019/0118876 | A1 * | 4/2019 | Schutt ................... B62D 53/10 |
| 2019/0329612 | A1 | 10/2019 | Gaufin et al. |
| 2019/0367107 | A1 | 12/2019 | Grossman |
| 2020/0102993 | A1 | 4/2020 | Antanaitis |
| 2020/0114711 | A1 | 4/2020 | Nixon |
| 2020/0331441 | A1 | 10/2020 | Sielhorst et al. |
| 2020/0398749 | A1 | 12/2020 | Mains, Jr. |
| 2021/0061247 | A1 | 3/2021 | Koziol |
| 2022/0185397 | A1 | 6/2022 | Soder et al. |
| 2022/0291687 | A1 | 9/2022 | Havens et al. |
| 2022/0358677 | A1 | 11/2022 | Critchley et al. |
| 2023/0382363 | A1 | 11/2023 | Gregoire |

FOREIGN PATENT DOCUMENTS

| | | |
|---|---|---|
| CN | 105874339 | 8/2016 |
| CN | 105983803 | 10/2016 |
| CN | 206847543 | 1/2018 |
| CN | 111348018 | 6/2020 |
| CN | 211855660 | 11/2020 |
| DE | 4021717 | 1/1992 |
| DE | 19820139 | 11/1999 |
| DE | 19964045 | 7/2001 |
| DE | 10065100 | 7/2002 |
| EP | 406036 | 1/1991 |
| EP | 471286 | 2/1992 |
| EP | 509137 | 10/1992 |
| EP | 794110 | 9/1997 |
| EP | 1147973 | 10/2001 |
| EP | 3954554 | 2/2022 |
| GB | 2331735 | 6/1999 |
| GB | 2543656 | 4/2017 |
| JP | 4981230 | 7/2012 |
| WO | 1996020864 | 7/1996 |
| WO | 2017144084 | 8/2017 |
| WO | 2021087451 | 5/2021 |

OTHER PUBLICATIONS https://www.jostinformationcentre.com/static/upload/pdf/truck/SKS_MUB_199007119_1006240_01-2016_EN.pdf, Jost World, Sensor JSK, Installation and operating instructions, Jan. 2016.
https://www.youtube.com/watch?v=xM_vMXThvHQ, Jost World, Jost KKS System, Aug. 16, 2010.
https://www.youtube.com/watch?v=9pMINQk9JYw, Jost World | JOST Sensor-Kupplungs-System SKS / Sensor-Coupling-System, Mar. 16, 2010.
https://www.jostinternational.com/37usk/, Jost International, JSK37USK Sensor Fifth Wheel, 2020.
Extended European Search Report for EP Application No. 19793336.9 dated Jan. 5, 2022.
International Seach Report and Written Opinion, PCT/US2019/029288, Jul. 3, 2019.
International Preliminary Examination Report on Patentability, PCT/US2019/029288, Nov. 5, 2020.
Fifth Wheel Catalog, https://www.jostinternational.com/wp-content/uploads/2016/06/5th-Wheel-Catalog.pdf, retrieved on Feb. 5, 2019.
Jost Product Bulletin, https://www.jostinternational.com/wp-content/uploads/2016/02/LT-JSK37-47-Product-Bulletin-Retractable-Handle-Update.pdf, retrieved on Feb. 5, 2019.
Vortex, Definition & Meaning, Merriam-Webster, https://www.merriam-webster.com/dictionary/vortex, 7 pages.
"Pneumatic Brake Actuator Design and Modeling for the Precision Stopping Control of Automated Bus" accessed from 235954812_Pneumatic_Brake_Actuator_Design_and_Modeling_for_the_Precision_Stopping_Control_of_Automated_Bus on Nov. 19, 2024.
Martin Andersson et al. "Indicator Module for Train Brake Actuator" LUP Student Papers, Lund University Libraries, 2007, MMK820.

(56) References Cited

OTHER PUBLICATIONS

Yang Meng et el., "Clamping Force Control of Electromechanical Brake Actuator Considering Contact Point between Friction Lining and Brake Disc", Actuators 2024, 13, 345.

* cited by examiner

APPARATUSES, SYSTEMS, AND METHODS FOR DETERMINING AND VERIFYING OPERATIONAL STATES OF FIFTH WHEELS

CROSS-REFERENCE TO RELATED APPLICATION

This application is a continuation of U.S. application Ser. No. 18/052,687, filed Nov. 4, 2022, which is a continuation of U.S. application Ser. No. 16/776,058, filed Jan. 29, 2020, now U.S. Pat. No. 11,524,536, issued Dec. 13, 2022, which claims priority to U.S. Provisional Patent Application No. 62/805,679 filed Feb. 14, 2019, the disclosure of which is incorporated herein by reference.

FIELD

The present disclosure relates to fifth wheels, and specifically to determining and verifying operational states of the fifth wheels.

BACKGROUND

The following U.S. patents are incorporated herein by reference in entirety.

U.S. Pat. No. 5,516,138 discloses a mechanism for locking and unlocking of a kingpin of a fifth wheel. The mechanism includes a jaw member, a wedge member, a bumper member and a lever member interconnecting the jaw member, the wedge and the bumper member. A handle member includes a handle extension member.

U.S. Pat. No. 5,641,174 discloses an interconnection of the jaw, wedge and operating handle in a fifth wheel facilitates the provision of an indicator on a secondary locking mechanism which further ensures the security of the system. The jaw is connected to the operating handle by a pivoting timing lever which pivots off a pin on the jaw such that the jaw remains engaged with the fifth wheel until the wedge is substantially removed from engagement with the jaw.

U.S. Pat. No. 7,735,849 discloses a fifth wheel hitch, a locking mechanism for retaining a trailer kingpin within a fifth wheel slot. The locking mechanism includes a jaw assembly comprised of two opposing jaw members pivotally attached at one end to the underside of the hitch plate, a longitudinally sliding cam interposed between the jaw members with a tip that contacts a bumper. The bumper is pivotally attached to tie bar that has its rear most end pivotally attached to the underside of the hitch plate. The mechanism also includes a wedge member and a secondary lock member pivotally attached thereto, where the lock member has a guide extension inserted through a guide hole in the tie bar.

U.S. Pat. No. 8,210,558 discloses a secondary lock assembly for a fifth wheel, where the fifth wheel includes a hitch plate with a rearward opening slot to receive a trailer kingpin and a transversely sliding primary locking member for retaining the kingpin within the slot. The assembly comprises a tie bar pivotally connected at its middle to the primary locking member and a transversely oriented pull bar pivotally connected at an inner end to the forward end of the tie bar. The pull bar comprises a rearward offset tab. A latch is pivotally connected roughly at the center of the latch to the forward end of the tie bar.

U.S. Pat. No. 9,302,557 discloses a fifth wheel includes a top plate having a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position.

U.S. Pat. No. 9,327,782 discloses a fifth wheel includes a top plate having a throat that is adapted to receive a kingpin of a trailer. The fifth wheel is equipped with a locking mechanism including a jaw slidably connected to the top plate and slidable between a closed position where the jaw blocks passage of a kingpin out of the throat of the fifth wheel and an open position where a kingpin may pass into and out of the throat of the fifth wheel. The jaw has an edge adapted to engage a kingpin positioned in the throat of the fifth wheel when the jaw is in the closed position.

U.S. Pat. No. 9,738,333 discloses a fifth wheel includes a top plate having a throat that is adapted to receive a kingpin of a trailer. A pair of locking jaws are pivotally connected to the top plate and pivotal between a closed configuration where the pair of locking jaws block passage of a kingpin out of the throat and the locking jaws are held primarily in compression and an open configuration where a kingpin may pass into and out of the throat.

SUMMARY

This Summary is provided to introduce a selection of concepts that are further described below in the Detailed Disclosure. This Summary is not intended to identify key or essential features of the claimed subject matter, nor is it intended to be used as an aid in limiting the scope of the claimed subject matter.

In certain examples, a method for determining an operational state of a fifth wheel includes sensing, with at least one sensor, magnetic flux caused by a magnet on a movable component movable to lock the fifth wheel to a kingpin of a towed vehicle, determining an end position of the movable component based on the magnetic flux, comparing the end position of the movable component to a threshold position, and determining an operational state of the fifth wheel based on the comparison of the end position of the movable component to the threshold position.

In certain examples, a fifth wheel system includes a fifth wheel configured to couple to a kingpin of a towed trailer and the fifth wheel has a movable component movable to lock the fifth wheel to the kingpin. A magnet is coupled to the movable component, and a sensor is in operative association with the fifth wheel and configured to sense magnetic flux caused by the magnet and generate data corresponding to the magnetic flux as the movable component moves to lock the fifth wheel to the kingpin. A controller is configured to receive the data and process the data to determine an end position of the movable component as the movable component moves, and the controller is further configured to compare the end position of the movable component to a threshold position to thereby determine operational state of the fifth wheel.

In certain examples, a method of verifying an operational state of a fifth wheel includes sensing a position of a movable component on a fifth wheel movable to lock the fifth wheel to a kingpin of a towed vehicle, determining a locked state of the fifth wheel based on the sensed position, and monitoring the position of the movable component for a predetermined amount of time after detecting the locked state. If a threshold change in the sensed position of the movable component is detected within the predetermined amount of time, the method includes storing a positive indicator of manual verification of the locked state of the fifth wheel by an operator.

In certain examples, a fifth wheel system includes a fifth wheel configured to couple to a kingpin of a towed trailer and the fifth wheel having a movable component movable to lock the fifth wheel to the kingpin. A sensor senses a position of the movable component, and a controller is configured to determine a locked state of the fifth wheel based on the position of the movable component and monitor the position of the movable component for a predetermined amount of time after detecting the locked state and detect a threshold change in the position of the movable component within the predetermined amount of time. The controller then stores a positive indicator of manual verification of the locked state of the fifth wheel by an operator.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DISCLOSURE

It is known to connect a towed trailer to a towing vehicle via a connection assembly commonly referred to as a fifth wheel. Specifically, a fifth wheel is a primary locking assembly on the towing vehicle that engages a kingpin of the towed trailer to thereby securely couple the towing vehicle to the towed trailer. Fifth wheels are constructed to avoid/prevent inadvertent disengagement of the kingpin from the fifth wheel.

Figure 1:
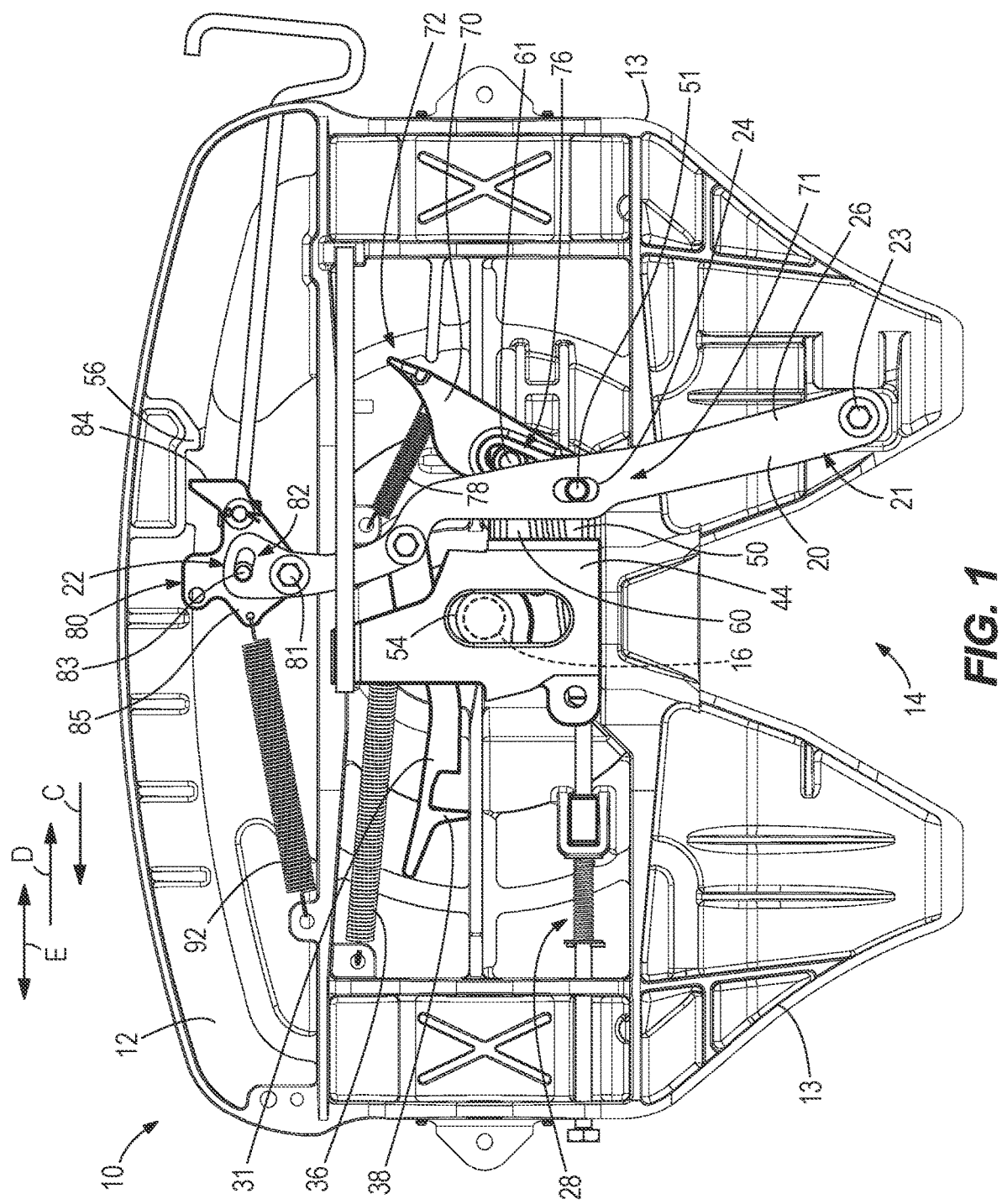
FIG. 1 is a bottom view of an example fifth wheel. An operating arm is shown in a locked position such that a kingpin is locked in the fifth wheel. A pull handle is shown retracted into the fifth wheel.
Figure 2:
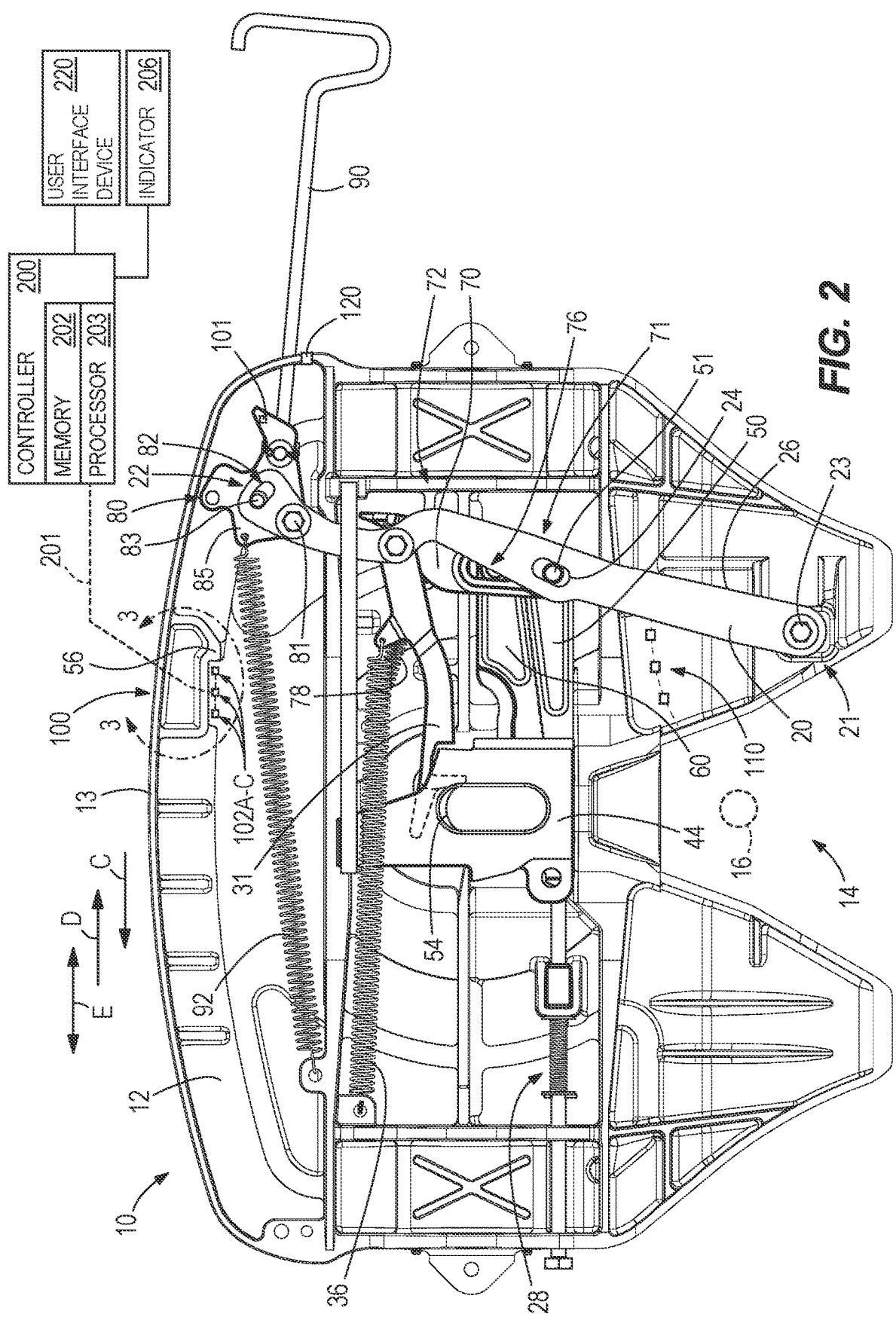
FIG. 2 is a view like FIG. 1 with the operating arm in an unlocked position such that the kingpin can be removed or inserted into the fifth wheel. The pull handle is shown in an extended position and extending from the fifth wheel.

FIGS. 1-2 are bottom or underside views of an example fifth wheel 10 of the present disclosure. The fifth wheel 10 has a top plate 12, a flange 13, and a throat 14 into which a kingpin 16 of a towed trailer (not shown) is received. The top plate 12 can include a variety of stabilizing and strengthening structures, such as gussets, flanges, ribs, and the like, that strengthen the top plate 12 and the flange 13 and provide point(s) of attachment for various components of the fifth wheel 10. For example, a bottom plate 44 is coupled to the top plate 12 and defines a lower surface of the throat 14. The top plate 12 and the flange 13 define a protected space in which operable components of the fifth wheel 10 are positioned.

An operating arm 20 is pivotally connected to the top plate 12 at a pivot axis 23, and the operating arm 20 is pivotable into and between a locked position (FIG. 1) in which the fifth wheel 10 locks onto the kingpin 16 and an unlocked opposition (FIG. 2) in which the fifth wheel 10 unlocks from the kingpin 16 (the locked and unlocked positions are described further herein). The operating arm 20 has a first end 21 pivotally coupled to the top plate 12 at the pivot axis 23 via a mechanical fastener such as a pin for bolt. The first end 21 is adjacent to the throat 14. The operating arm 20 is elongated between the first end 21 and an opposite, second end 22. A coil spring 36 biases (e.g., pulls) the operating arm 20 toward the throat 14 in a first direction (see arrow C).

A pull handle 90 is coupled to the operating arm 20 and is operable to pivot the operating arm 20 from the locked position (FIG. 1) to the unlocked position (FIG. 2). Specifically, the pull handle 90 is pulled in a second direction (see arrow D) such that the operating arm 20 pivots toward the unlocked position (FIG. 2) and away from the throat 14. As the operating arm 20 pivots toward the unlocked position (FIG. 2), a wedge 50 and a jaw 60, which are pivotally coupled to the operating arm 20, also move away from the throat 14 (see arrow D). Accordingly, the kingpin 16 can be inserted into the throat 14 or removed from throat 14. When the kingpin 16 is inserted into the throat 14, the operating arm 20 pivots back to the locked position (FIG. 1), due to the coil spring 36 exerting a pulling force on the operating arm 20. As the operating arm 20 pivots toward the locked position (FIG. 1), the wedge 50 and the jaw 60 linearly move toward the throat 14 (see arrow C) to thereby lock the fifth wheel 10 onto the kingpin 16 (described further herein). As the wedge 50 and the jaw 60 move toward the throat 14 (see arrow C), the wedge 50 urges the jaw 60 into contact with the kingpin 16 to thereby force the kingpin 16 against a fixed jaw 54 on the top plate 12 and lock the fifth wheel 10 onto the kingpin 16.

The wedge 50 is pivotally coupled to the operating arm 20 between the ends 21, 22 of the operating arm 20 with a wedge pin 51 that is received in a first slot 24 of the operating arm 20. The wedge pin 51 slides in the first slot 24 as the operating arm 20 pivots such that the wedge 50 linearly moves (see direction arrow E). In certain examples, a knock-out assembly 28 is coupled to the top plate 12 and can be actuated to apply a direct force to the wedge 50 to thereby dislodge the wedge 50 and/or the operating arm 20 in the event either component becomes jammed and prevents the release of the kingpin 16 from the fifth wheel 10.

The jaw 60 is also pivotally coupled to the operating arm 20 via a timing lever 70. The jaw 60 has a jaw pin (not shown) that is received in an elongated slot 76 of the timing lever 70 and a first end 71 pivotally coupled to the operating arm 20 via the wedge pin 51 (see above). As the operating arm 20 pivots, the wedge 50 linearly moves (as described above), the timing lever 70 pivots about wedge pin 51, the jaw pin slides in the elongated slot 76, and the jaw 60 linearly moves with the wedge 50. The timing member 70 has an opposite, second end 72 with a follower pin (not shown) extending therefrom that slides along an outside edge 26 (FIG. 2) of the operating arm 20 as the operating arm 20 pivots. The timing lever 70 is biased toward the throat 14 with an extension spring 78. The operating arm 20, the wedge 50, and the timing lever 70 are all generally plate-like members and are in stacked relation to one another. Reference is made to the above-incorporated U.S. Pat. Nos. 5,641,174 and 5,988,665 for description and operation of a conventional timing lever and associated components.

A trigger arm 31 is pivotally coupled to the operating arm 20 and is for holding the operating arm 20 in the unlocked position (FIG. 2). The trigger arm 31 extends transverse to the throat 14 and slides on the bottom plate 44 as the operating arm 20 pivots into and between the locked position (FIG. 1) and the unlocked position (FIG. 2). The trigger arm 31 has a trigger 38 that moves into the throat 14 as the operating arm 20 pivots toward the unlocked position (FIG. 2), and the trigger 38 prevents the operating arm 20 from pivoting back to the locked position (FIG. 1) until the kingpin 16 inserted into the throat 14. Specifically, when the kingpin 16 is received into the throat 14 the kingpin 16 contacts and moves the trigger 38 out of the throat 14 causing the trigger arm 31 to pivot relative to the operating arm 20 and the trigger 38 to clear the bottom plate 44. The trigger arm 31 then slides along the bottom plate 44 and the operating arm 20 pivots back toward the locked position (FIG. 1) as the coil spring 36 "pulls" the operating arm toward the throat 14. The coil spring 36 is shown connected to the trigger arm 31, however, in other examples the coil spring 36 is directly connected to the operating arm 20. In the example depicted in FIG. 1, the trigger 38 is a finger member that projects from the trigger arm 31.

The operating arm 20 is held or locked in the locked position (FIG. 1) with a secondary lock assembly 80 that is pivotally coupled to the second end 22 of the operating arm 20 via pin 81. The secondary lock assembly 80 has a pawl member 84 and an opposite, dog member 85 that each radially extend away from a stabilizing pin 83 that is received in an arcuate slot 82 defined in the second end 22 of the operating arm 20. A coil spring 92, connected between the secondary lock assembly 80 and a flange on the top plate 12, exerts a pulling force in the first direction (see arrow C) to thereby urge the secondary lock assembly 80, and further urge the operating arm 20, toward the locked position (FIG. 1) and in the first direction (see arrow C). In operation, as the operating arm 20 pivots from the unlocked position (FIG. 2) toward the locked position (FIG. 1) the secondary lock assembly 80 moves in the first direction (see arrow C) and the pawl member 84 seats behind a stop surface 56 on the top plate 12 to thereby stop or prevent the operating arm 20 from pivoting in the opposite second direction (see arrow D) toward the unlocked position (FIG. 1). To pivot the operating arm 20 to the unlocked position (FIG. 2), the pawl member 84 must be pivoted about pin 81 to clear the stop surface 56. The pull handle 90 is connected to the secondary lock assembly 80 in such a way that as the operator pulls the pull handle 90 in a second direction (see arrow D) the pawl member 84 pivots about pin 81 to clear the stop surface 56 and the operating arm 20 pivots to the unlocked position (FIG. 2). Accordingly, the kingpin 16 can be received into or moved out of the fifth wheel 10.

The present inventors have observed that in certain circumstances the fifth wheel 10 may not fully or properly lock onto the kingpin 16. For example, the pawl member 84 of the secondary locking assembly 80 may not fully seat behind the stop surface 56 and accordingly, the operating arm 20 does not reach the locked position (see FIG. 1) and the fifth wheel 10 is in an unlocked operational state. As such, the kingpin 16 could inadvertently move out of the throat 14. If this occurs on the roadway, the towed trailer may unhitch from the towing vehicle. Accordingly, it is advantageous to provide systems that verify that the fifth wheel 10 is properly locked onto the kingpin 16 and is therefore in the locked operational state. Furthermore, it is advantageous to provide systems that store or log that the operator checked to ensure that the fifth wheel 10 is properly locked onto the kingpin 16 and is in the locked operational state. These systems, as will be described in greater detail below, are capable of sensing and logging proper locking of the fifth wheel 10 onto the kingpin 16 and/or manual interaction between the operator of the towing vehicle and the fifth wheel 10 to thereby create a log that the fifth wheel 10 has been properly locked and/or manually checked or verified by the operator. In addition, the present inventors have also observed that the operable components (e.g., the wedge 50, the jaw 60) of the fifth wheel 10 wear over time as the kingpin 16 contacts and rubs on the jaw 60. This wearing occurs when the kingpin 16 is received into the fifth wheel 10 and during towing. Certain conventional fifth wheels have various "slack" adjustment mechanisms that help account for the wear, however, once wear becomes excessive these mechanisms are no longer able to account for the wear and the operating arm 20 may "over" pivot in the first direction (see arrow C) toward the throat 14. This additional pivoting may cause vibrations or "jiggling" between the kingpin 16 and the fifth wheel 10 during towing. Accordingly, it is advantageous to provide systems that detect wear of the fifth wheel 10 and that the fifth wheel 10 is in one or more worn operational states. Furthermore, the systems of the present disclosure can alert the operator of the towing vehicle that the fifth wheel 10 is in one of the worn operational states and/or that excessive wear has occurred to one or more components of the fifth wheel 10.

As such, the present inventors have developed systems for determining the operational state of the fifth wheel 10 and verifying the operational state of fifth wheel 10. These systems noted above and further described herein below.

Referring to FIG. 2, the system 100 of the present disclosure is shown in relation to the operable components of the fifth wheel 10, which are described above. In particular, the system 100 includes a magnet 101 on a movable component of the fifth wheel 10 that moves or is movable to lock the fifth wheel 10 to the kingpin 16. The movable component in this example is the pawl member 84 of the secondary lock assembly 80, however, a person of ordinary skill in the art will recognized that the magnet 101 can be on any movable component (e.g., the operating arm, trigger arm). One or more sensors 102A-C on the top plate 12 that are capable of sensing the magnet 101 as the magnet 101 moves past each sensor 102A-C. Generally, as the operating arm 20 pivots toward the throat 14 (see arrow C) and the locked position (FIG. 1) the magnet 101 moves past one or more of the sensors 102A-C. Each sensor 102A-C that senses the magnet 101 sends a signal or data to a controller 200 which is in communication, via wired or wireless communication links 201, with the sensors 102A-C. Based on the data received from the sensors 102, the controller 200 determines if the operating arm 20 has pivoted into the locked position (FIG. 1) and the fifth wheel 10 is in the locked operational state. The controller 200 can also determine if the operating arm 20 has pivoted past the locked position (FIG. 1) such that the fifth wheel 10 is in a worn operational state, which as is noted above is indicative of excessive wear of operable components of the fifth wheel 10. Further description of the system 100 is provided hereinbelow.

Figure 3:
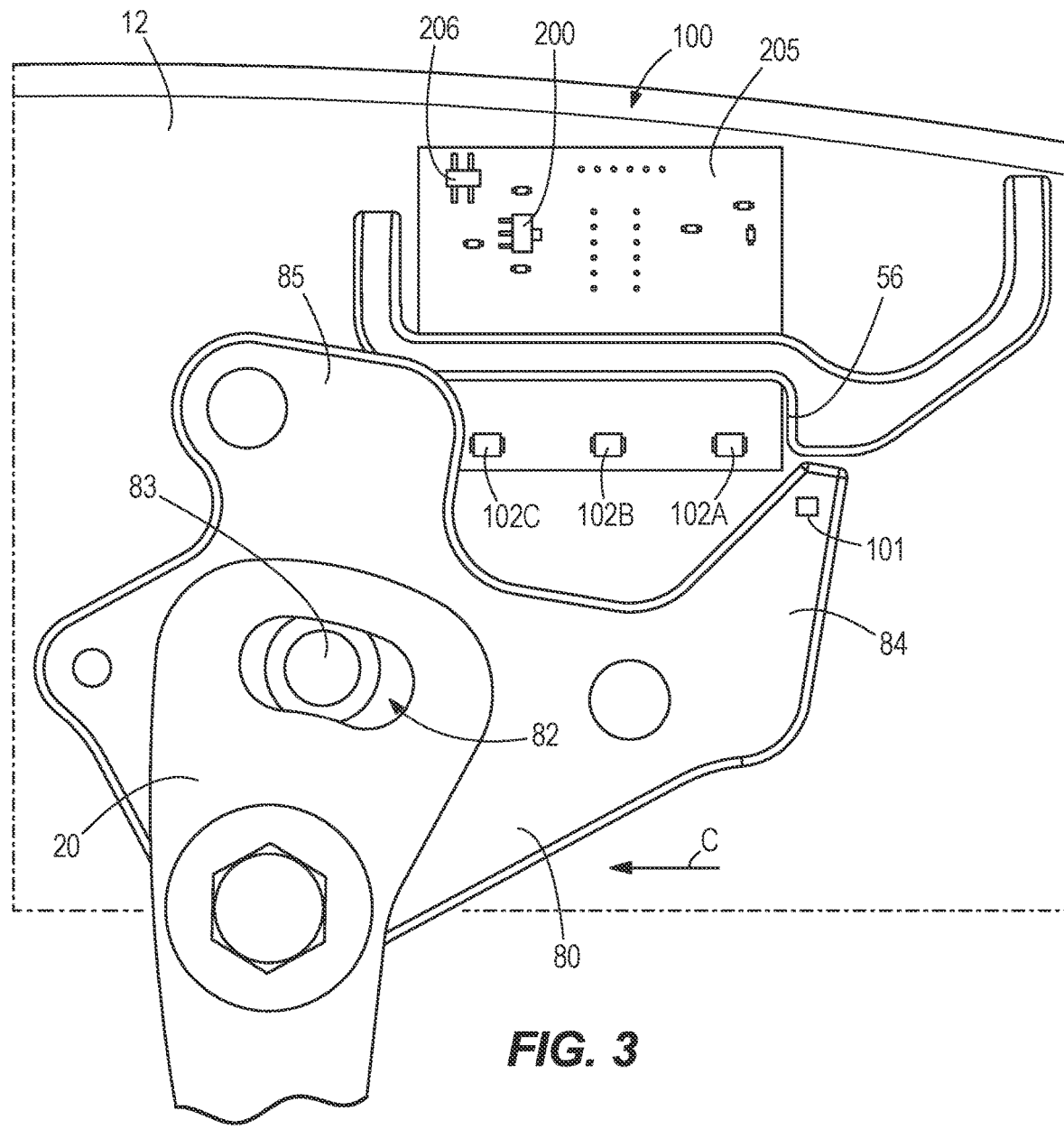
FIG. 3 is an enlarged view within line 3-3 on FIG. 2. A pawl member is near a stop surface and is adjacent to a linear series of three sensors.

Referring now to FIG. 3, a schematic an example system 100 is shown in greater detail. The system 100 includes a printed circuit board (PCB) 205 on which the controller 200 with a memory 202 and a processor 203 (see FIG. 2) and a series of sensors 102A, 102B, 102C are coupled. In this example, the sensors 102A-C are linearly positioned next to the stop surface 56 (see also FIG. 2) and the magnet 101 is on the pawl member 84 of the secondary lock assembly 80. The pawl member 84 is shown next to the stop surface 56, which may occur as the operating arm 20 is pivoting from the unlocked position (FIG. 2) to the locked position (FIG. 1) and moving in the first direction (see arrow C) toward the throat 14 (FIG. 1). When the pawl member 84 is next to the stop surface 56, none of the sensors 102A-C sense the magnet 101. Accordingly, no data is sent to the controller 200 and the controller 200 does not indicate, via an indicator 206 (e.g., operator input/interface device, light emitting diode), that the operating arm 20 is in the locked position (FIG. 2). The fifth wheel 10 is this example in an unlocked state and the indicator 206 may indicate the unlocked state of the fifth wheel 10.

Figure 4:
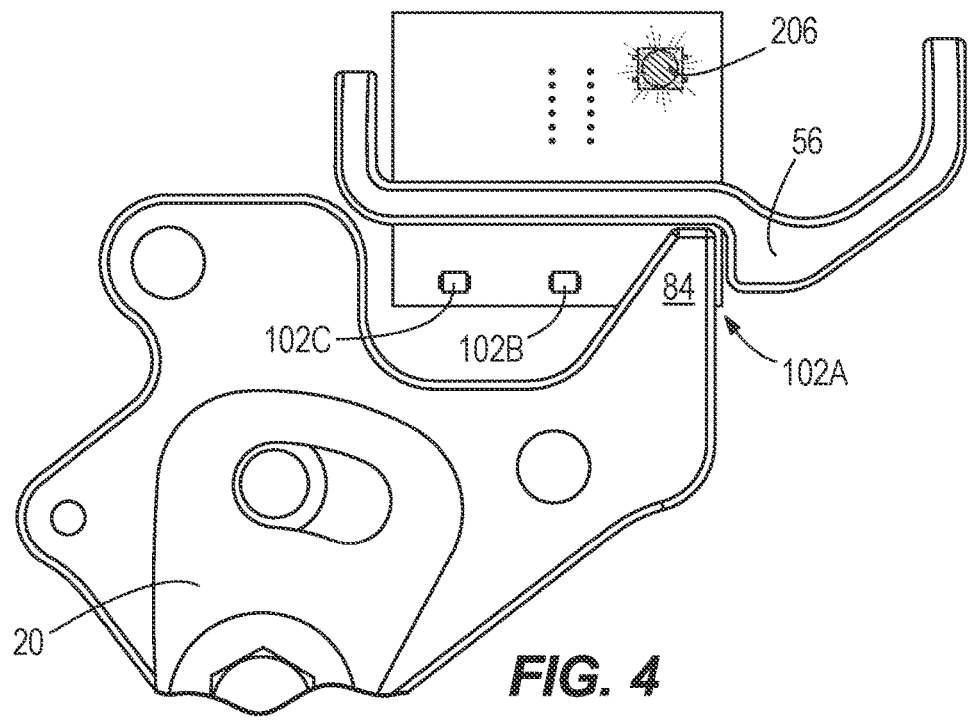
FIG. 4 is a view like FIG. 3 with the pawl member in close proximity to a first sensor and the indicator emitting light having a first color.

As the operating arm 20 further pivots toward the locked position (FIG. 1) and in the first direction (see arrow C), the pawl member 84 seats behind the stop surface 56 (see also FIG. 4) and the first sensor 102A senses the magnet 101. Accordingly, the first sensor 102A sends data to the controller 200 and the controller 200 controls the indicator 206 to indicate that the operating arm 20 is in the locked position (FIG. 1) and the fifth wheel 10 is in the locked state. FIG. 4 depicts the indicator 206, which is a multi-color LED, that emits light that is a first color (e.g., green light) when the first sensor 102A senses the magnet 101.

Figure 5:
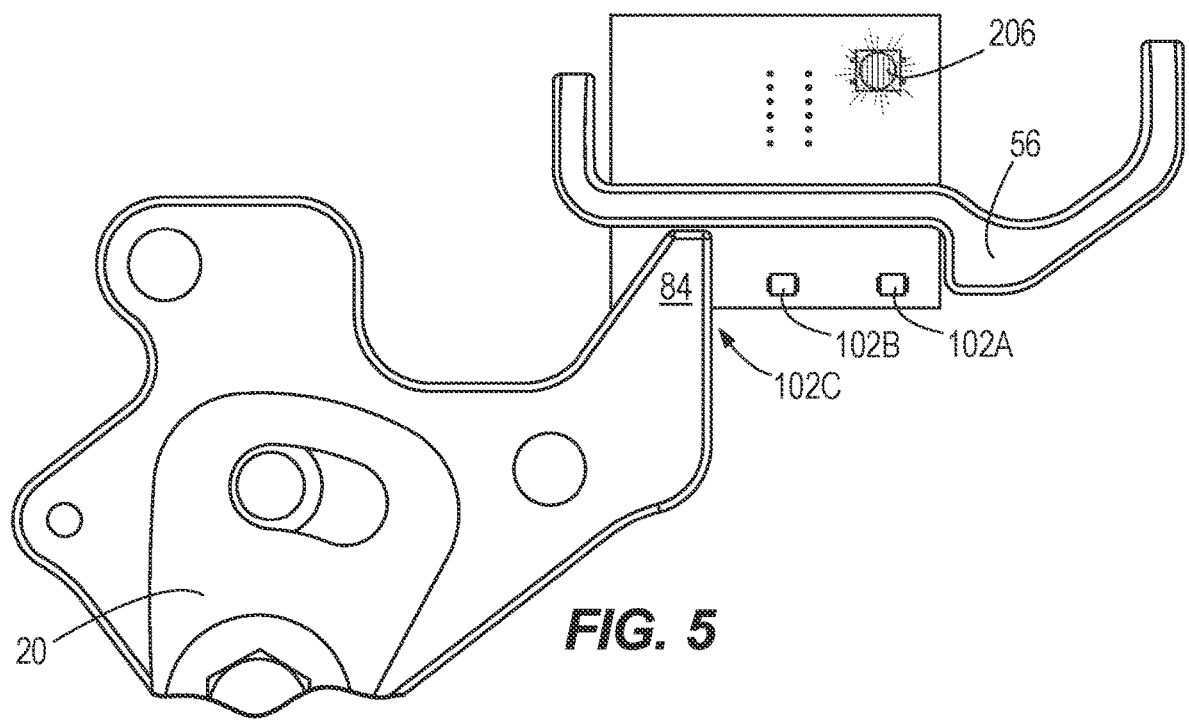
FIG. 5 is a view like FIG. 3 with the pawl member in close proximity to a second sensor and the indicator emitting light having a second color.

Returning to FIG. 3, if the operating arm 20 continues to pivot in the first direction (see arrow C), the second sensor 102B senses the magnet 101 and the second sensor 102B sends data to the controller 200. As noted above, the operating arm 20 pivots past the locked position (FIG. 1) when excessive wear of the operable components of the fifth wheel 10 is occurring and the fifth wheel 10 is a worn state. As such, the controller 200 indicates, via the indicator 206, that the operating arm 20 has pivoted past the locked position (FIG. 1) and thereby alerts the operator that the fifth wheel 10 should be inspected and/or repaired. FIG. 5 depicts the indicator 206 emitting light that is a second color (e.g., red light) when the second sensor 102B senses the magnet 101.

Additional sensors, such as the third sensor 102C, are provided to detect further movement of the operating arm 20 in the first direction (see arrow C) and thereby determine if the operable components of the fifth wheel 10 are additionally worn and the fifth wheel 10 is in other worn states. For example, when the second sensor 102B senses the magnet 101 and sends data to the controller 200 such that the controller 200 indicates, via the indicator 206, that the operating arm 20 has moved past the locked position (FIG. 1), the operable components are worn to a first worn state (e.g., 20.0% remaining life), and/or alert the operator that the fifth wheel 10 should be inspected and/or repaired. However, when the second sensor 102B and the third sensor 102C sense the magnet 101 (within a predetermined time period) and both send data to the controller 200 the controller 200 indicates, via the indicator 206, different information to the operator. For example, the controller 200 may indicate that the operable components are worn to a second worn state (e.g., 10.0% remaining life) and/or alert the operator that the fifth wheel 10 should be taken out of service until repaired.

While FIG. 3 depicts the sensors 102A-C near the stop surface 56 and the magnet 101 on the pawl member 84, the sensors 102A-C and the magnet 101 can be positioned at different locations on the fifth wheel 10 to detect pivoting of the operating arm 20. For example, the sensors 102A-C can be placed on the top plate 12 near the first end 21 of the operating arm 20 (see arrow 110 on FIG. 2) in an arc pattern to thereby detect the operating arm 20 as it pivots along an arc path. In this example, the magnet 101 is positioned on the operating arm 20 near the first end 21.

The type of sensors 102A-C may vary and in certain examples are Hall-Effect sensors. In other examples, the sensors 102A-C are capable of sensing the relative weakness or strength of the magnetic field of the magnet 101. In addition, while a magnet 101 is described as being sensed by the sensors 102A-C, the magnet 101 can be replaced with any other suitable element capable of being sensed by the sensors 102A-C. For example, the sensors 102A-C may detect the secondary lock assembly 80, the pawl member 84, the operating arm 20, indicia on the operating arm 20, reflective tape, and/or the like. Furthermore, in certain examples the magnet 101 is coupled to the movable component (e.g., pawl member) of the fifth wheel 10 with a bracket or clip (not shown). In these examples, it is possible to couple the magnet 101 to existing fifth wheel 10 such the existing fifth wheel 10 can be retrofitted to include the system 100.

In certain examples, the controller 200 is configured to record and store or log the data received from the sensors 102A-C. For instance, when the data corresponding to manually checking and/or engagement of the fifth wheel by the operator is received from any one of the sensors 102A-C, the controller 200 records a timestamp, which can comprise a date and a time, when the data is received. As such, a fleet manager can access this data log to observe operation and wear of the fifth wheel 10. Furthermore, the data log provides a method for determining if the fifth wheel 10 has been properly cared for and inspected should the towed trailer come unhitched and cause damage and/or other liabilities.

In certain examples, at least one of the sensors 102 is for sensing a position of the movable component (e.g., pawl member) and the controller 200 is configured to determine the locked state of the fifth wheel 10 based on the position of the movable component. The controller 200 is further configured to monitor the position of the movable component for a predetermined amount of time (e.g., 2.0 minutes, 45.0 seconds) after detecting the locked state. Further, if a threshold change in the position of the movable component is detected by the sensor 101 and thereby determined by the controller 200 within the predetermined amount of time, the controller 200 is further configured to store, on the memory 202 of the controller 200, a positive indicator of manual verification of the locked state of the fifth wheel 10 by an operator. In certain examples, if the threshold change in the sensed position of the movable component is not detected within the predetermined amount of time, the controller 200 can store a negative indicator of manual verification of the locked state of the fifth wheel 10 by an operator.

The controller 200 can be on the fifth wheel 10 or remote from the fifth wheel 10. For example, the controller 200 can be on the control system for the towing vehicle or integral the control system for the towing vehicle such that a separate controller is not needed. The controller 200 and the sensors 102A-C can be battery powered and/or powered by the power system of the towing vehicle.

Certain safety rules and/or laws require that the operator of the towing vehicle get out of the towing vehicle to manually and physically check that the fifth wheel 10 is locked onto the kingpin 16 and the fifth wheel 10 is in the locked state. This commonly requires the operator to grasp and shake the pull handle 90 and/or pull the pull handle 90 out a few inches to ensure that the pawl member 84 is seated behind the stop surface 56 (see FIG. 1).

In other examples, the system 100 can include a handle or secondary sensor 120 (FIG. 2) for sensing movement of the pull handle 90 when the operator physically checks that the fifth wheel 10 is properly locked to the kingpin 16. The secondary sensor 120 is placed on the pull handle 90 or on the top plate 12. Once the fifth wheel 10 locks onto the kingpin 16 and the controller 200 logs one or more data received from the sensors 102A-C (as described above), the controller 200 is programmed to monitor for data from the secondary sensor 120 within a stored time (e.g. 2.0 minutes, a time period for the operator to get out of the towing vehicle and walk back to the fifth wheel 10). If the operator engages (e.g. shakes) the pull handle 90 within the stored time, the controller 200 logs the data from the secondary sensor 120 and determines that the fifth wheel 10 was checked by the operator. If no data is received from the secondary sensor 120, the controller 200 does not record any information.

Figure 6:
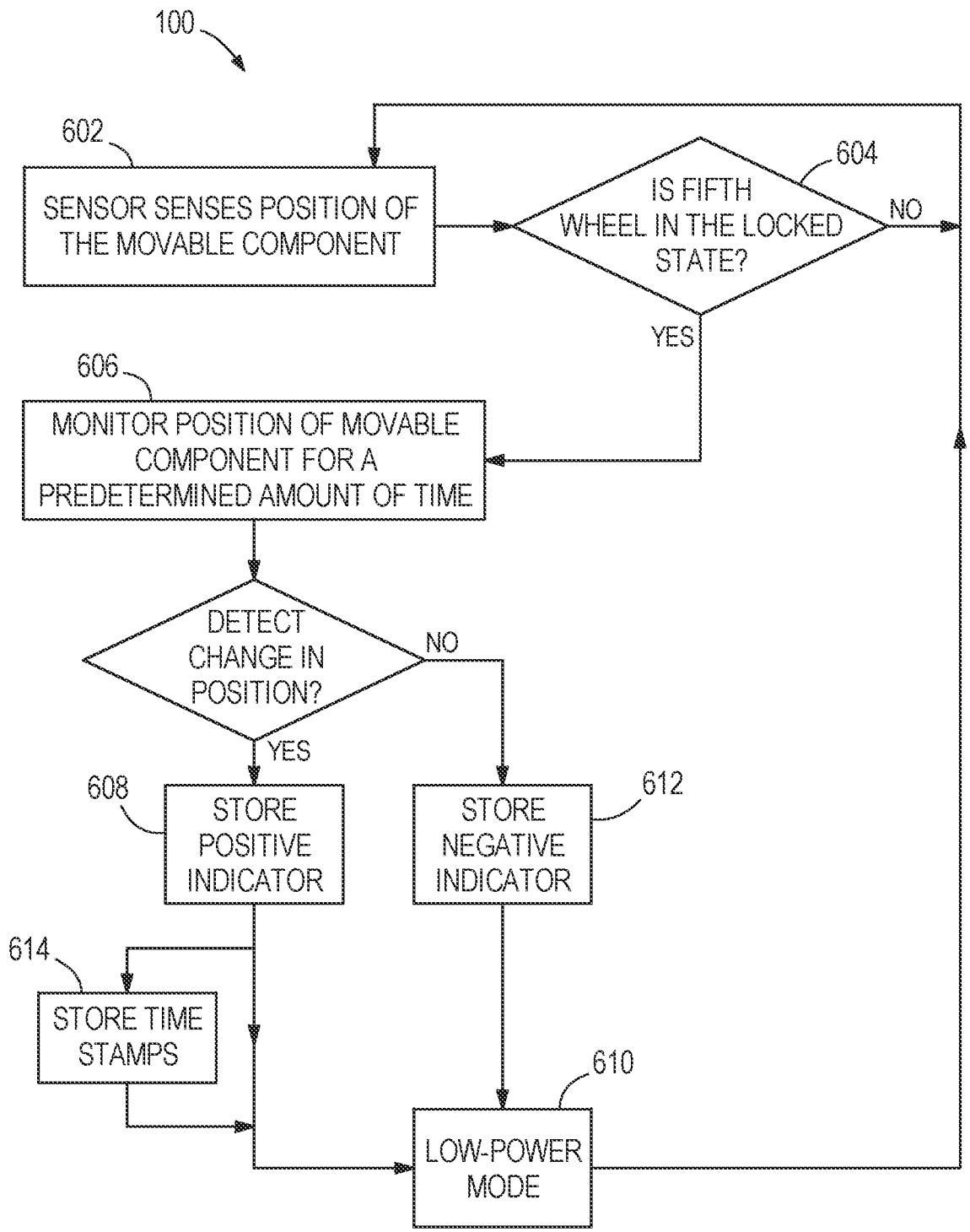
FIG. 6 depicts an example method of the present disclosure for verifying an operational state of the fifth wheel.

Referring to FIG. 6, an example method for verifying the operational state of the fifth wheel 10 is (FIG. 1) is depicted. As shown at 602, the method begins with sensing, with at least one sensor 102A-C, position of the movable component on the fifth wheel 10 that moves to lock the fifth wheel 10 to the kingpin 16. The controller 200 is configured to determine if the fifth wheel 10 is in the locked state based on the sensed position of the movable component, depicted at 604. If the fifth wheel 10 is not in the locked state, the method returns to 602. However, if the fifth wheel 10 is in the locked state, the controller 200 is configured to monitor the position of the movable component for a predetermined amount of time after determining the locked state of the fifth wheel 10, depicted at 606. At 608, if a threshold change in the sensed position of the movable component is detected within the predetermined amount of time, the controller 200 stores a positive indicator of manual verification of the locked state of the fifth wheel 10 by an operator. The controller 200 may then optionally enter a low-power mode, depicted at 610, until the controller 200 determines the fifth wheel 10 is not in the locked state. The method then returns to 602. In certain examples, the threshold change can be a distance (e.g., 1.0 inches of movement from the sensed position).

Optionally, at 612, if a threshold change in the sensed position of the movable component is not detected within the predetermined amount of time, the controller 200 stores a negative indicator of manual verification of the locked state of the fifth wheel 10 by an operator. The controller 200 may then optionally enter the low-power mode, depicted at 610. Still further, the method may optionally include storing a first timestamp when the predetermined amount of time begins and storing a second timestamp when storing a second timestamp when the threshold change occurs, as depicted at 614.

In another example, the secondary sensor 120 senses movement of the pull handle 90 out of the fifth wheel 10 as the operator pulls the pull handle 90 and movement into the fifth wheel 10 as the pull handle 90 retracts into the fifth wheel 10. In this example, a magnet (such as the magnet 101 on the pawl member 84) is sensed by the secondary sensor 120. That is, as the pull handle 90 is pulled out of the fifth wheel 10, the secondary sensor 120 senses the magnet 101 and sends a first signal (e.g., "ON"). Once the secondary sensor 120 does not sense the magnet 101 (due to continued pulling of the pull handle 90 such that the magnet 101 moves past the secondary sensor 120), the secondary sensor 120 sends a second signal (e.g., "OFF"). When the pull handle 90 is released and the pull handle 90 retracts back into the fifth wheel 10, the secondary sensor 120 again senses the magnet 101 and sends another first signal. In another similar example, the sensors 102A-C may sense the magnet 101 as the pull handle 90 moves into and out of the fifth wheel 10 (as described above).

In still another example, when the pull handle 90 is pulled by the operator at least one of the sensors 102A-C senses movement of the magnet 101 as the pawl member 84 pivots away from and/or toward the sensors 102A-C. In this example, at least one of the sensors 102A-C senses the magnet 101 and sends a first signal (e.g., "ON") before the pawl member 84 pivots away from the sensors 102A-C. When the pawl member 84 pivots away from the sensors 102A-C (due to pulling of the pull handle 90), at least one of the sensors 102A-C does not sense the magnet 101 and sends a second signal (e.g., "OFF"). When the pull handle 90 is released, the pawl member 84 pivots, the magnet 101 is moved back toward the sensors 102A-C, and at least one of the sensors 102A-C senses the magnet 101 and sends another first signal. In another example, multiple sensors 102A-C sense the magnet 101 and send different signals as the pawl member 84 pivots. For instance, before the pawl member 84 pivots away from the sensors 102A-C, the second sensor 102B senses the magnet 101 and sends the first signal. At the same time, the first sensor 102A does not sense the magnet 101 and therefore sends the second signal. As the pawl member 84 pivots away from the sensors 102A-C, the second sensor 102B does not sense the magnet and sends the second signal. At the same time, the first sensor 102A now senses the magnet 101 and therefore sends the first signal. Finally, as the pawl member 84 pivots back toward the sensors 102A-C (after the pull handle 90 is released) the first sensor 102A no longer senses magnet 101 and sends the second signal and the second sensor 102B again senses the magnet 101 and sends the first signal. A person of ordinary skill in the art will recognize that while some of the above examples describe a second signal being sent by the sensor(s), the sensor(s) may not actually send a second signal and instead the controller 200 records absence of the first signal.

The signals or data received or not received from the sensors 102A-C and/or the secondary sensor 120 is logged by the controller 200 to thereby provide a detailed log of the operational state of the fifth wheel (e.g., locked state, unlocked state, worn state), presence of the kingpin 16 in the fifth wheel 10, and/or operator interaction with the fifth wheel 10. The logged data (e.g., date, time, frequency, locked or unlocked) may be stored locally on the memory 202 of the controller 200 or remotely in the control systems of the towing vehicle, and the logged data can be accessed by the fleet manager. Accordingly, the operator is held accountable for performing all necessary safety checks when operating the towing vehicle and the fifth wheel 10. Furthermore, the secondary sensor 120 can provide added liability defense for the fleet manager or original equipment manufacturer (OEM). The secondary sensor 120 can be any suitable sensor such as a momentary vibration sensor.

Figure 7:
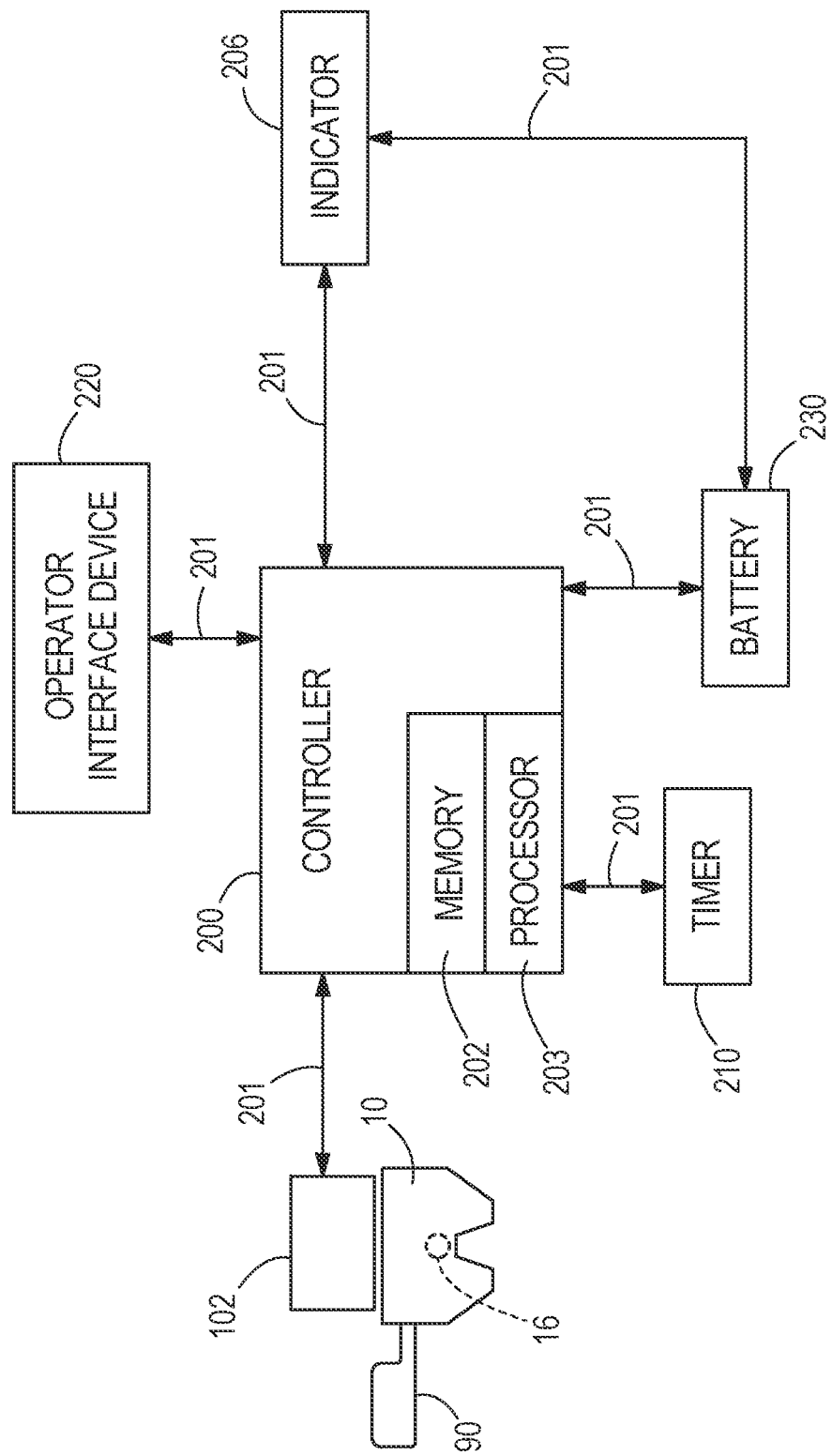
FIG. 7 is a schematic of an example sensing system of the present disclosure.

Referring to FIG. 7, another example system 100 of the present disclosure is depicted. In this example, the sensor 102 senses the magnet 101 as a movable component of the fifth wheel 10, such as the operating arm 20, the secondary lock assembly 80, or the pawl member 84 (FIG. 2), moves to lock the fifth wheel 10 to the kingpin 16. As discussed in greater detail herein below, the controller 200 receives data from the sensor 102 and processes the data to thereby determine an end position of the movable component after the movable component has moved. For example, the end position may be the position of the pawl member 84 after it seats behind the stop surface 56 (FIG. 2) and stops moving. The controller 200 then compares the end position to a threshold position (described further herein) which may be a position in which the movable component has moved into a position that corresponds to positive locking of the fifth wheel 10 to the kingpin (e.g., the position of the pawl member 84 as depicted in FIG. 1). Accordingly, the controller 200 determines an operational state of the fifth wheel 10, such as a worn state, a locked state, or an unlocked state, based on the comparison of the end position of the movable component to the threshold position. The controller 200 is coupled to and in communication with an indicator 206 indicates the operational state of the fifth wheel 10 to an operator and/or fleet manager.

The number and type of operational states of the fifth wheel 10 can vary based on the condition of the fifth wheel 10 and operation thereof. Generally, in the locked state, the fifth wheel 10 is properly locked onto the fifth wheel 10 (FIG. 1). Accordingly, the end position of the movable component, as sensed by the sensor 102, is in a predetermined locked threshold position stored on the memory 202 of the controller 200 that corresponds to proper movement of components of the fifth wheel 10 and locking of the fifth wheel 10 onto the kingpin 16 (FIG. 1). However, if the fifth wheel 10 does not properly lock onto the fifth wheel, due to incorrect insertion of the kingpin 16 into the throat 14 and/or improper operation of the fifth wheel 10, the end position of the movable component is not at the predetermined locked threshold position. Therefore, the end position corresponds to an unlocked state of the fifth wheel 10.

In addition, as can be appreciated by persons of ordinary skill in the art, stationery and movable components of the fifth wheel 10 may wear over time and thus movable components may move into positions different than a baseline or initial predetermined locked threshold position when the fifth wheel 10 is locked onto the kingpin 16 (FIG. 1). Thus, the end position is not in the predetermined locked threshold position, and therefore, the end position corresponds to a worn state of the fifth wheel 10. One or more predetermined worn threshold positions can be stored on the memory 202 of the controller 200, and each worn threshold position may correspond to a remaining life expectancy of one or more components of the fifth wheel 10. For example, a first threshold position corresponds to a first worn state of the fifth wheel in which a component of the fifth wheel 10 has a first remaining life expectancy (e.g., 4000 remaining lock-unlock operations) and a second worn state of the fifth wheel in which a component of the fifth wheel 10 has a second remaining life expectancy (e.g., 500 remaining lock-unlock operations).

The components of the system 100, including the sensor 102, the indicator 206, the controller 200, and the other components thereof, are described in greater detail hereinbelow.

As noted above, the sensor 102 is in operable association with the fifth wheel 10. Note that in the example depicted in FIG. 2, the sensors 102A-C are coupled to the top plate 12. However, a person of ordinary skill in the art will recognize that the sensor(s), such as the sensor 102 depicted in FIG. 7, can be connected to any suitable component of the fifth wheel 10. In one example, the sensor 102 is contained within a water-tight housing (not shown), which is fastened to the top plate 12 via mechanical fasteners or adhesives, so that the sensor 102 is protected from debris and moisture.

The sensor 102 can be a device capable to sensing magnetic flux generated by the magnet 101 on the movable component of the fifth wheel 10, such as the pawl member 84 (see FIG. 2). The Furthermore, the specific sensor 102 used in the system 100 may depend on the specific type of magnet 101. The sensor 102 can be a Hall-Effect sensor. In other examples, the sensor 102 capable of sensing the magnetic field of the magnet 101 in the x, y, and z directions such that the sensor 102 is capable of sensing the three-dimensional movement of the magnet 101 and thereby the movable component of the fifth wheel 10 to which the magnet 101 is coupled. An example of a sensor 102 capable of sensing the three-dimensional movements of the magnet 101 is commercially available from Infineon (model #TLV493D-A1B6). As noted above and depicted in FIG. 2, more than one sensor may be used in the system 100 (e.g., multiple sensors 102 are used for redundancy and/or error checking other sensors 102). The sensor 102 generates or outputs position data in the form of analog signals or digital signals, depending on the type of sensor 102 used. In certain examples, the sensitivity of the sensor 102 can be adjusted, either manually or by the controller 200, to thereby increase the accuracy of the sensor 102 and/or account for variations in the magnetic field that may be affected by the specific location of the magnet 101 on the movable member (e.g., interference of the magnet field caused by certain metallic components of the fifth wheel 10). In certain examples, the sensor 102 is capable of sensing magnetic flux causes by components of the fifth wheel such that the magnet 101 may be excluded. In other examples, the sensor 102 could be another type of sensor capable of sensing movement of the components of the fifth wheel 10.

As noted above, the sensor 102 generates or outputs data to the controller 200 which is configured to process the data. The controller 200 includes the processor 203 and the memory 202, and the controller 200 can be located anywhere in the system 100. The controller 200 is in communication with the various components of the system 100 via wired and/or wireless communication links 201. In certain examples, the system 100 includes more than one controller 200. The controller 200 includes a timer or counter 210 such that velocity and/or distance traveled can be determined based on the data received from the sensor 102. The controller 200 is also configured to receive date or inputs from other components in the system 100 such as the operator interface device 220 and/or the indicator 206. The components of the system 100 (e.g., the controller 200, the sensor 102, and the indicator 206) are powered by a battery 230 and/or a power source (not shown) on the towing vehicle or the towed vehicle.

As noted above, the controller 200 processes the data to determine an end position of the movable component based on the magnetic flux caused by the magnet 101. The controller 200 then compares the end position of the movable component to the locked threshold position such that the operational state of the fifth wheel 10 can be determined. The locked threshold position is predetermined and may correspond to a position in which the pawl member 84 seats behind the stop surface 56 (FIG. 2) when the fifth wheel 10 properly couples to the kingpin 16.

In certain examples, the locked threshold position is determined based on controlled, repeatable tests in which the fifth wheel 10 properly couples to the kingpin 16. Accordingly, the locked threshold position can be identified by examining the end position of one or more movable components of the fifth wheel 10, and/or the magnet 101 coupled to one of the movable components from each test. The locked threshold position is then inputted into the controller 200 and stored on the memory 202. In other examples, the controller 200 is configured to "learn" the locked threshold position based on repeated coupling events between the fifth wheel 10 and the kingpin 16.

Figure 8A:
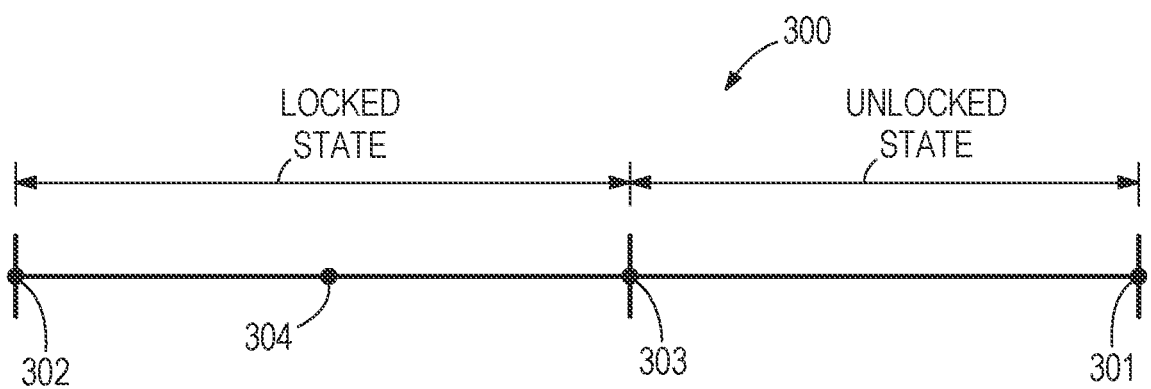
FIG. 8A-8B are example graphical representation of potential positions along which a movable component of the fifth wheel may move during the operation of the fifth wheel.

Referring to FIG. 8A, the locked threshold position is on a continuum of potential positions along which the movable component and/or the magnet 101 may move. FIG. 8A is an example linear graphical representation 300 of the potential positions along which the movable component may move during the operation of the fifth wheel 10. In this example, the sensor 102 generates data corresponding to one coordinate direction (e.g., the x-coordinate) and thereby the controller 200 can determine the position of the movable components along a single coordinate axis (e.g., x-coordinate axis). The linear graphical representation 300 includes a first position extent 301 that may correspond to when the operating arm 20 is in the unlocked position as depicted in FIG. 2. In other examples, the first position extent 301 corresponds to the maximum sensing range of the sensor 102 in a first direction (e.g., in a direction to the right relative to the fifth wheel 10) along one coordinate axis. The continuum of potential positions extends from the first position extent 301 to a second position extent 302 that may correspond to the maximum sensing range of the sensor 102 in a second direction (e.g., in a direction to the left relative to the fifth wheel 10) along one coordinate axis. The locked threshold position 303 is predetermined (as noted above) and on the continuum of potential positions between the position extents 301, 302.

In the example depicted in FIG. 8A, the locked threshold position 303 corresponds to the locked state of the fifth wheel 10 in which the fifth wheel 10 is locked onto the kingpin 16. For instance, the locked threshold position 303 corresponds to when the pawl member 84 is seated behind the stop surface 56 (FIG. 1). In this example, if the controller 200 determines that the end position of the movable component is at the locked threshold position 303, the controller 200 determines that the operational state of the fifth wheel 10 is the locked state in which the fifth wheel 10 is properly locked to the kingpin 16. In this example, the controller 200 may also determine the fifth wheel 10 is in the locked state when further movement of the movable component occurs such that the end position is located between the locked threshold position 303 and the second position extent 302 (see position 304). However, if the controller determines that the end position of the movable component is between the locked threshold position 303 and the first position extent 301, the controller 200 determines that the operational state of the fifth wheel is the unlocked state in which the fifth wheel is improperly locked or not locked onto the kingpin 16.

Figure 8B:
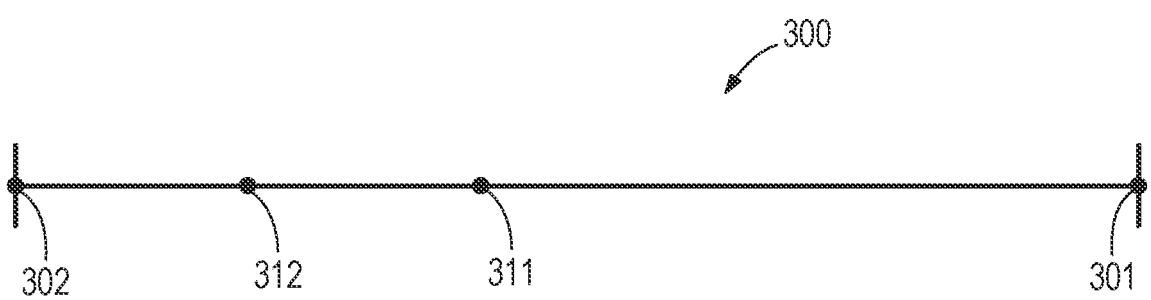

Referring now to FIG. 8B, the controller 200 can be configured to determine if the operational state of the fifth wheel 10 is in one or more worn states in which one of the components of the fifth wheel is worn. The worn threshold positions are on a continuum of potential positions along which the movable component and/or the magnet 101 may move. FIG. 8B, like FIG. 8A, is an example linear graphical representation 300 of the potential positions along which the movable component may move during the operation of the fifth wheel 10. Like the example noted above with respect to FIG. 8A, the sensor 102 generates data corresponding to one coordinate direction (e.g., the x-coordinate) and thereby the controller 200 can determine the position of the movable components along a single coordinate axis (e.g., x-coordinate axis). In this example, the controller 200 has one or more predetermined worn threshold positions stored on the memory 202 that are on the continuum of potential positions that extend between the extents 301, 302. For instance, a fist worn threshold position 311 and a second worn threshold position 312. The first worn threshold position 311 that corresponds to a first worn state, and the first worn state corresponds a first remaining life expectancy of one or more components of the fifth wheel 10. (e.g., 4000 remaining lock-unlock operations of the fifth wheel 10). The second worn threshold position 312 corresponds to a second worn state in which at least one of the components of the fifth wheel 10 is worn, and the second worn state corresponds a second remaining life expectancy of one or more components of the fifth wheel 10. (e.g., 500 remaining lock-unlock operations of the fifth wheel 10). By determining the worn state of the fifth wheel 10, the controller 200 can help the operator and/or fleet manager decide if and/or when the fifth wheel 10 should be scheduled for maintenance, inspected, and/or repaired.

In this example, if the controller 200 determines that the end position of the movable component is at the first worn threshold position 311, the controller 200 determines that the operational state of the fifth wheel 10 is the first worn state. However, if the controller 200 determines that the end position of the movable component is at the second worn threshold position 311, the controller 200 determines that the operational state of the fifth wheel 10 is the second worn state. Note that in certain examples, the controller 200 can be configured to determine the worn state independent from the locked state or the unlocked state (e.g., the controller 200 determines that the fifth wheel 10 is in the work state but does not determine the locked state or the unlocked state). In other examples, the controller 200 can be configured to determine the locked state or unlocked state together with or based on the worn state (e.g., the controller 200 determines that fifth wheel 10 is in the first worn state and therefore, the fifth wheel 10 also in the locked state).

In certain examples, the controller 200 can be configured to assess position vectors. In this example, the locked threshold position and/or the worn threshold position(s) include two or more positions on the continuum of potential positions. The continuum of potential positions can include positions within a sensing range of the sensor 102. In addition, the end position determined by the controller 200 includes two or more positions sensed over time as the movable component moves to the locked state. The position vector can include a time series of position measurements that are sensed by the sensor 10 and further processed by the controller 200. The position vector corresponds to movement of the magnet 101 as the movable component moves to lock the fifth wheel 10 to the kingpin 16 and is based on the data generated by the sensor 102. In one embodiment, the sensor generates position data relative to two or more coordinates (e.g., the x-coordinate and the y-coordinate) and thereby the controller 200 can determine the position vector of the movable components relative to the two or more coordinate axes (e.g., x-coordinate axis and the y-coordinate axis). The sensed, position vector is then compared to the positions of the locked threshold position and/or the worn threshold position(s).

Depending on the operational state of the fifth wheel determined by the controller 200, the controller 200 controls the indicator 206 to thereby indicate the operational state to the operator. The indicator 206 is any suitable indicator, such as a visual indicator (e.g. LED), audio indicator (e.g. speaker), or any other indicator capable of indicating to the operator. Specifically, the indicator 206 may produce an audible alert and/or a visual alert. In certain examples, the indicator 206 is part of the drive system of the towing vehicle. The location of the indicator 206 can vary, such as on the fifth wheel 10 or in the cab on the towing vehicle. The controller 200 may further control the operator input device 220 to thereby display or indicate the operational state to the operator. In operation examples, the indicator 206 is part of the operator interface device 220, or vice versa.

Furthermore, the controller 200 may further control the indicator 206 and/or the operator interface device 220 to generate a first alert (e.g., emit yellow light) when the fifth wheel 10 is in the first worn state (as described above) and/or a second alert (e.g., emit red light) when the fifth wheel 10 is in the second worn state (as described above).

Figure 9:
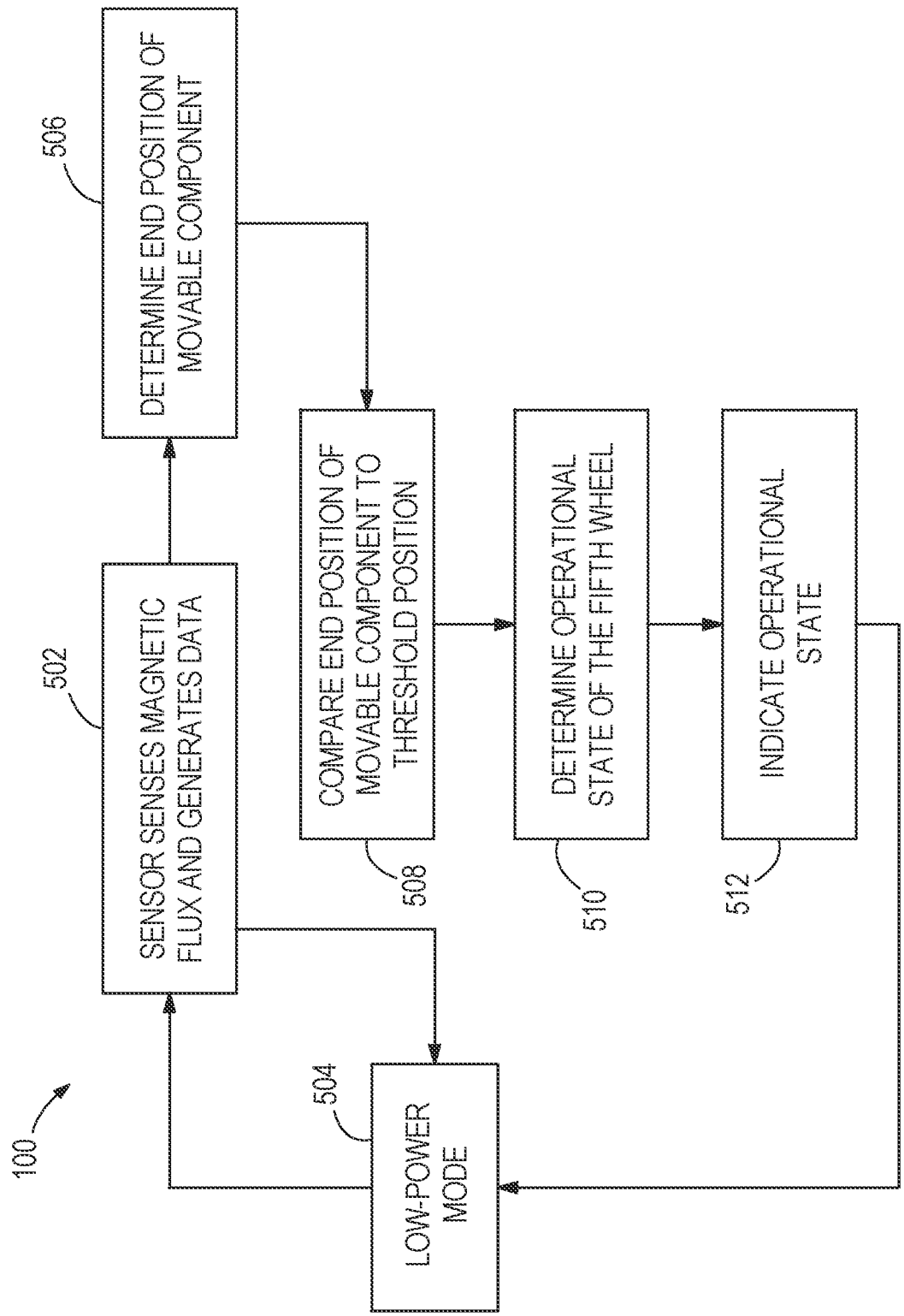
FIG. 9 depicts an example method of the present disclosure for determining an operational state of the fifth wheel.

Referring now to FIG. 9, an example method for determining the operational state of the fifth wheel 10 (FIG. 1) is depicted. Note that components of the fifth wheel 10 and/or the system 100 not depicted in FIG. 9 are depicted in FIG. 2. As shown at 502, the method begins sensing, with at least one sensor 102, magnetic flux caused by the magnet 101 on a movable component (e.g., the pawl member 84) movable to lock the fifth wheel 10 to the kingpin 16 and generating position data that corresponds to the movement of the movable component. Optionally, if the position data generated does not indicate movement of the movable component (e.g., the position data is consistent and does not change because there is no movement of the movable component; the fifth wheel 10 is in the locked state), the controller 200 may enter a low-power mode. Based on the position data received by the controller 200, the controller 200 determines the end position of the movable component, shown at 506. At 508, the controller 200 compares the end position of the movable component to the predetermined locked threshold position and/or the worn threshold position(s) that is stored on the memory 202 (FIG. 6). Note the threshold position may be part of a look-up table. Based on the comparison of the end position of the movable component to the threshold position, the controller 200 determines the operational state of the fifth wheel, depicted at 310. The controller 200 then controls the indicator 206 to thereby indicate the operational state of the fifth wheel 10 to the operator, depicted at 312. Thereafter, the controller 200 may enter the low-power mode (shown at 504) until the sensor 102 senses additional changes to the magnetic flux caused by the magnet 101 that may be indicative of movement of the movable component and change in operational state of the fifth wheel 10.

In certain examples, a method for determining an operational state of a fifth wheel includes sensing, with at least one sensor, magnetic flux caused by a magnet on a movable component movable to lock the fifth wheel to a kingpin of a towed vehicle, determining an end position of the movable component based on the magnetic flux, comparing the end position of the movable component to a threshold position, and determining an operational state of the fifth wheel based on the comparison of the end position of the movable component to the threshold position.

In certain examples, the method can further include indicating the operational state of the fifth wheel with an indicator. The operational state is at least one of a worn state, a locked state, or an unlocked state. The end position can be on a continuum of potential positions along which the magnet may move as the movable component moves to lock the fifth wheel to the kingpin. The threshold position can be on the continuum of potential positions and corresponds to a worn state of the fifth wheel in which at least one component of the fifth wheel is worn. The method can include generating an alert, with an indicator, when the fifth wheel is in the worn state. In certain examples, the worn state corresponds to remaining life expectancy of the at least one component of the fifth wheel. The worn state can be a first worn state and the method can include comparing the end position to a second threshold position such that the second threshold position corresponds to a second worn state of the fifth wheel in which the at least one component of the fifth wheel is worn and the second worn state corresponds to remaining life expectancy of the at least one component of the fifth wheel that is less than that of the first worn state. In certain examples, the method includes generating, with an indicator, a first alert when the fifth wheel is in the first worn state and a second alert when the fifth wheel is in the second worn state.

In certain examples, the method includes determining a position vector that corresponds to movement of the magnet as the movable component moves to lock the fifth wheel to the kingpin. The threshold position can include two or more positions on the continuum of potential positions such that determining the operational state includes comparing the magnet position vector to the two or more positions. In certain examples, the end position is determined based on data from at least two sensors. In certain examples, the sensor is a 3D Hall Effect sensor. In certain examples, the threshold position is on the continuum of potential positions and corresponds to a locked state of the fifth wheel in which the fifth wheel is locked onto the kingpin. The method can further include comprising indicating, with an indicator, if the fifth wheel is in the locked state or an unlocked state. In certain examples, the threshold position includes two or more positions on the continuum of potential positions such that the threshold position is a position vector that corresponds to movement of the magnet as the movable component moves to the locked state of the fifth wheel and the end position includes two or more positions.

In certain examples, a fifth wheel system includes a fifth wheel configured to couple to a kingpin of a towed trailer and the fifth wheel has a movable component movable to lock the fifth wheel to the kingpin. A magnet is coupled to the movable component, and a sensor is in operative association with the fifth wheel and configured to sense magnetic flux caused by the magnet and generate data corresponding to the magnetic flux as the movable component moves to lock the fifth wheel to the kingpin. A controller is configured to receive the data and process the data to determine an end position of the movable component as the movable component moves, and the controller is further configured to compare the end position of the movable component to a threshold position to thereby determine operational state of the fifth wheel. An indicator indicates the operational state of the fifth wheel.

In certain examples, the operational state can be at least one of a worn state, a locked state, or an unlocked state. The end position can be on a continuum of potential positions along which the magnet may move as the movable component moves to lock the fifth wheel to the kingpin. In certain examples, the threshold position is on the continuum of potential positions and corresponds to a worn state of the fifth wheel in which at least one component of the fifth wheel is worn. The indicator can generate an alert when the fifth wheel is in the worn state, and the worn state corresponds to remaining life expectancy of the at least one component of the fifth wheel.

In certain examples, the threshold position is a first threshold position and the worn state is a first worn state such that the controller is further configured to compare the end position of the movable component to a second threshold position that corresponds to a second worn state of the fifth wheel in which the at least one component of the fifth wheel is worn, and the second worn state corresponds to remaining life expectancy of the component of the fifth wheel that is less than the remaining life expectancy of the at least one component of the fifth wheel than the first worn state. In certain examples, the indicator is configured to generate a first alert when the fifth wheel is in the first worn state and a second alert when the fifth wheel is in the second worn state. The controller can be further configured to determine a position vector that comprises the two or more positions as the movable component moves to lock the fifth wheel to the kingpin. In certain examples, the threshold position includes two or more positions on the continuum of potential positions, and controller is configured to compare the magnet position vector to the two or more positions. The end position can be determined based on data from at least two sensors. In certain examples, the sensor is a 3D Hall Effect sensor.

In certain examples, the threshold position is on the continuum of potential positions and corresponds to a locked state of the fifth wheel in which the fifth wheel is locked onto the kingpin. The indicator can indicate if the fifth wheel is in the locked state or an unlocked state. The controller can be configured to determine a position vector that comprises the two or more positions as the movable component moves to lock the fifth wheel to the kingpin, and the threshold position can include two or more positions on the continuum of potential positions, and wherein controller is configured to compare the position vector to the two or more positions.

In certain examples, a method of verifying an operational state of a fifth wheel includes sensing a position of a movable component on a fifth wheel movable to lock the fifth wheel to a kingpin of a towed vehicle, determining a locked state of the fifth wheel based on the sensed position, and monitoring the position of the movable component for a predetermined amount of time after detecting the locked state. If a threshold change in the sensed position of the movable component is detected within the predetermined amount of time, the method includes storing a positive indicator of manual verification of the locked state of the fifth wheel by an operator. In certain examples, if the threshold change in the sensed position of the movable component is not detected within the predetermined amount of time, the method includes storing a negative indicator of manual verification of the locked state of the fifth wheel by an operator. In certain examples, storing a first timestamp when the predetermined amount of time begins and storing a second timestamp when the threshold change occurs.

In certain examples, a fifth wheel system includes a fifth wheel configured to couple to a kingpin of a towed trailer and the fifth wheel having a movable component movable to lock the fifth wheel to the kingpin. A sensor senses a position of the movable component, and a controller is configured to determine a locked state of the fifth wheel based on the position of the movable component and monitor the position of the movable component for a predetermined amount of time after detecting the locked state and detect a threshold change in the position of the movable component within the predetermined amount of time. The controller then stores a positive indicator of manual verification of the locked state of the fifth wheel by an operator In certain examples, a method for determining an operational state of a fifth wheel includes sensing, with at least one sensor, magnetic flux caused by a movable component movable to lock the fifth wheel to a kingpin of a towed vehicle, determining an end position of the movable component based on the magnetic flux, comparing the end position of the movable component to a threshold position, and determining an operational state of the fifth wheel based on the comparison of the end position of the movable component to the threshold position.

In certain examples, a fifth wheel system includes a fifth wheel configured to couple to a kingpin of a towed trailer and the fifth wheel has a movable component movable to lock the fifth wheel to the kingpin. A sensor is in operative association with the fifth wheel and configured to sense magnetic flux and generate data corresponding to the magnetic flux as the movable component moves to lock the fifth wheel to the kingpin. A controller is configured to receive the data and process the data to determine an end position of the movable component as the movable component moves, and the controller is further configured to compare the end position of the movable component to a threshold position to thereby determine operational state of the fifth wheel.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for determining a remaining life expectancy of a component of a fifth wheel, the method comprising:
sensing, with at least one sensor, magnetic flux caused by a magnet coupled to a movable component that moves as the fifth wheel locks onto a kingpin of a towed vehicle;
determining an end position of the movable component based on the sensed magnet flux;
comparing the end position to one or more worn threshold positions; and
determining the remaining life expectancy of the component of the fifth wheel based on the comparison of the end position to the one or more worn threshold positions.

2. The method according to claim 1, wherein the one or more worn threshold positions includes a first worn threshold position corresponding to a first remaining life expectancy of the component of the fifth wheel and a second worn threshold position corresponding to a second remaining life expectancy of the component of the fifth wheel.

3. The method according to claim 2, wherein the second remaining life expectancy of the component is less than the first remaining life expectancy of the component.

4. The method according to claim 1, further comprising:
indicating, with an indicator, the remaining life expectancy of the component or generating an alert, with the indicator, corresponding to the remaining life expectancy of the component.

5. The method according to claim 1, further comprising storing data generated by the sensor corresponding to the sensed magnetic flux on to a memory.

6. The method according to claim 5, further comprising accessing the data stored on the memory to thereby observe operation of the fifth wheel over time.

7. The method according to claim 1, wherein the at least one sensor is a 3D Hall Effect sensor.

8. The method according to claim 1, wherein the sensing the magnetic flux includes sensing the magnetic flux with two or more sensors.

9. A fifth wheel configured for coupling to a kingpin of a towed trailer, the fifth wheel comprising:
a movable component that moves as the fifth wheel locks onto the kingpin;
a magnet coupled to the movable component;
a sensor in operative association with the fifth wheel and configured to sense magnetic flux caused by the magnet and generate data corresponding to the sensed magnetic flux; and
a controller configured to receive the data from the sensor and process the data from the sensor to determine an end position of the movable component;
wherein the controller is further configured to compare the end position of the movable component to a worn threshold position and determine a remaining life expectancy of a component of the fifth wheel based on the comparison between the end position of the movable component to the worn threshold position.

10. The fifth wheel according to claim 9, wherein the worn threshold position is a first worn threshold position corresponding to a first remaining life expectancy of the component of the fifth wheel; and
wherein the controller is further configured to compare the end position of the movable component to a second worn threshold position that corresponds to a second remaining life expectancy of the component of the fifth wheel.

11. The fifth wheel according to claim 10, wherein the second remaining life expectancy of the component is less than the first remaining life expectancy of the component.

12. The fifth wheel according to claim 9, further comprising an indicator that indicates the remaining life expectancy of the component and/or generates an alert.

13. The fifth wheel according to claim 9, wherein the at least one sensor is a 3D Hall Effect sensor.

14. The fifth wheel according to claim 9, wherein the controller has a memory on which the data from the sensor is stored and the data stored on the memory can be accessed to thereby observe operation of the fifth wheel over time.

15. The fifth wheel according to claim 9, wherein the sensor is a first sensor and further comprising a second sensor configured to sense the magnetic flux and generate data corresponding to the magnetic flux; and
wherein the controller is configured to receive the data from the second sensor and process the data from the first sensor and the second sensor to determine the end position of the movable component.

16. The fifth wheel according to claim 9, wherein the controller includes a timer such that the controller determines velocity of the movable component.

* * * * *